(12) United States Patent
Yamauchi

(10) Patent No.: US 8,836,823 B2
(45) Date of Patent: Sep. 16, 2014

(54) IMAGE PICKUP SENSOR, DRIVING METHOD THEREFOR, AND IMAGE PICKUP APPARATUS

(75) Inventor: Makiko Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1145 days.

(21) Appl. No.: 12/622,991

(22) Filed: Nov. 20, 2009

(65) Prior Publication Data

US 2010/0128148 A1 May 27, 2010

(30) Foreign Application Priority Data

Nov. 27, 2008 (JP) ................................. 2008-302535

(51) Int. Cl.
*H04N 5/217* (2011.01)
*H04N 5/335* (2011.01)
*H04N 5/361* (2011.01)
*H04N 5/376* (2011.01)
*H04N 5/357* (2011.01)

(52) U.S. Cl.
CPC ............. *H04N 5/361* (2013.01); *H04N 5/3765* (2013.01); *H04N 5/357* (2013.01)
USPC ............ 348/241; 348/302; 348/304; 348/308

(58) Field of Classification Search
CPC ..... H04N 5/361; H04N 5/3575; H04N 5/378; H04N 9/045; H04N 5/341
USPC .......................... 348/241, 302, 294, 304, 308
See application file for complete search history.

(56) References Cited

U.S. PATENT DOCUMENTS

| | | | |
|---|---|---|---|
| 5,608,455 A | 3/1997 | Oda | |
| 7,030,920 B1 * | 4/2006 | Hayashi et al. | 348/302 |
| 2006/0114342 A1 * | 6/2006 | Egawa | 348/241 |

FOREIGN PATENT DOCUMENTS

| | | |
|---|---|---|
| CN | 1538740 A | 10/2004 |
| JP | 06-078224 | 3/1994 |
| JP | 2004-320346 A | 11/2004 |
| JP | 2007-013331 A | 1/2007 |
| JP | 2007-018458 A | 1/2007 |

(Continued)

OTHER PUBLICATIONS

The above references were cited in a Feb. 9, 2012 Korean Office Action, which is enclosed without an English Translation, that issued in Korean Patent Application No. 10 2009 0115560.

(Continued)

*Primary Examiner* — Twyler Haskins
*Assistant Examiner* — Quang Le
(74) *Attorney, Agent, or Firm* — Cowan, Liebowitz & Latman, P.C.

(57) ABSTRACT

An image pickup sensor that can properly carry out correction processing on noise components at high speed without bringing about an increase in cost. In an effective pixel region, pixels for obtaining image pickup signals used as a picked-up image are arranged. A plurality of reference pixel regions in which pixels for obtaining reference signals for the image pickup signals are arranged are disposed adjacent to opposing sides of the effective pixel region. A holding unit holds the image pickup signals obtained from the effective pixel region and the reference signals obtained from the plurality of reference pixel regions, the image pickup signals and the reference signals vertically scanned on a row-by-row basis. A horizontal scanning unit that horizontally scans the image pickup signals and the reference signals held by the holding unit horizontally scans the reference signals held by the holding unit before the image pickup signals.

15 Claims, 11 Drawing Sheets

(56) References Cited

FOREIGN PATENT DOCUMENTS

| | | |
|---|---|---|
| JP | 2007-336343 A | 12/2007 |
| JP | 2008-124842 A | 5/2008 |
| JP | 2008-288816 A | 11/2008 |
| JP | 2009-017036 A | 1/2009 |
| KR | 2002-0070183 A | 9/2002 |

OTHER PUBLICATIONS

The above reference was cited in a Jul. 4, 2011 Chinese Office Action, which is enclosed with English Translation, that issued in Chinese Patent Application No. 200910207484.6.

The above references were cited in a Dec. 11, 2012 Japanese Office Action, which is enclosed without an English Translation, that issued in Japanese Patent Application No. 2008-302535.

* cited by examiner

IMAGE PICKUP SENSOR, DRIVING METHOD THEREFOR, AND IMAGE PICKUP APPARATUS

BACKGROUND OF THE INVENTION

1. Field of the Invention

The present invention relates to an image pickup sensor, a driving method therefor, and an image pickup apparatus.

2. Description of the Related Art

For image pickup apparatuses such as digital cameras and video cameras, a solid-state image pickup device such as a CMOS image sensor is widely used as an image pickup sensor.

In recent years, a solid-state image pickup device has increased in the number of pixels, and the size of each pixel has been made small. However, as the pixel size decreases, the quantity of light incident on each pixel decreases, and therefore, pixels are likely to be affected by noise, bringing about degradation in image quality.

A description will now be given of a principle on which the noise is generated with reference to FIGS. 8 and 9. FIG. 8 is a circuit diagram schematically showing an arrangement of a pixel in a CMOS image sensor (hereinafter referred to as a "CMOS sensor"). Each pixel in the CMOS sensor has a photodiode PD that converts photoelectrons into electrical charges (signal electrical charges) and accumulates the same, and a transfer switch M1 that transfers signal electrical charges accumulated in the photodiode PD to a floating diffusion FD.

Each pixel mentioned above also has an amplification MOS transistor M3 that converts signal electrical charges in the floating diffusion FD into voltage and amplifies the same, a reset switch M2 that resets signal electrical charges in the photodiode PD and the floating diffusion FD. Turning-on/off of the reset switch M2 is controlled by a pixel reset signal PRES from a vertical scanning circuit 93 (see FIG. 9). Further, each pixel mentioned above has a row selection switch M4.

A description will now be given of how signal electrical charges generated and accumulated in the photodiode PD are scanned. In a given nth row in a pixel group 90, first, a reset operation is carried out in which a pixel reset signal PRES and a transfer signal PTX are applied from the vertical scanning circuit 93 to turn on the transfer switches M1 and the reset switches M2, and unnecessary electrical charges accumulated in the photodiodes PD and the floating diffusions FD in the nth row are removed. Next, an accumulating operation is started in which the transfer switches M1 are turned off to start the accumulation of signal electrical charges generated in the photodiodes PD. Then, a transfer operation is carried out in which a transfer signal PTX is applied from the vertical scanning circuit 93 to turn on the transfer switches M1, and the signal electrical charges accumulated in the photodiodes PD are transferred to the floating diffusions FD. After completion of the transfer operation in the nth row, a row selection signal PSEL is applied from the vertical scanning circuit 93 to collectively turn on the row selection switches M4 of the respective pixels in the nth row. As a result, the electrical charges accumulated in the floating diffusions FD of the respective pixels in the nth row are converted into voltages, which are then outputted all at once to a vertical signal line V.

FIG. 9 is a circuit diagram schematically showing an overall arrangement of the general CMOS sensor. The CMOS sensor has the pixel unit 90, the vertical scanning circuit 93, a line memory 94, and a horizontal scanning circuit 96. The pixel unit 90 is comprised of an effective pixel region 91 and a reference pixel region 92.

Signal electrical charges in the effective pixel region 92 are actually used as a picked-up image reflecting a subject, and signal electrical charges in the reference pixel region 92 are used as reference signals for obtaining image signals not dependent on a state of the subject. It should be noted that pixels in the reference pixel region 92 are comprised of light-blocking pixels shielded from light by light shield members such as metallic films, or non-photosensitive pixels that do not have photodiodes.

Among pixels arranged in a matrix in the pixel unit 90, the accumulation, vertical transfer, and resetting of signal charges in respective pixels arranged in the same row are controlled at the same time by a transfer signal PTX, a reset signal PRES, and a row selection signal PSEL from the vertical scanning circuit 93. Moreover, respective pixels arranged in the same columns are commonly connected to the same vertical output lines V1 to Vm−1, and the respective vertical output lines V1 to Vm−1 are connected to respective line memories C1 to Cm−1. The line memories C1 to Cm−1 are connected to a horizontal output line 95 via respective horizontal scanning switches Q1 to Qm−1.

The horizontal scanning switches Q1 to Qm−1 are controlled by the horizontal scanning circuit 96. The horizontal scanning circuit 96 has D flip-flops FF1 to FFm−1 connected to the respective horizontal scanning switches Q1 to Qm−1, and the respective D flip-flops FF1 to FFm−1 are connected in series in such a manner that Q output terminals and D input terminals are sequentially connected to each other. The D flip-flop FF will hereinafter be abbreviated as "DFF".

Thus, when a horizontal scanning start pulse signal PHST is inputted to the D input terminal of DFF1 in the first stage, the horizontal scanning start pulse signal PHST is sequentially shift-transferred to DFF2 to DFFm−1 in the subsequent stages, so that the horizontal scanning switches Q1 to Qm−1 are sequentially turned on.

As a result, the signal electrical charges (also referred to as pixel signals) of the respective pixels arranged in the same row vertically transferred to the line memories C1 to Cm−1 are sequentially read out to the horizontal output line 95 and outputted to an image processing circuit 7 in a subsequent stage. On the other hand, each time a vertical scanning pulse signal PV, not shown, is inputted to the vertical scanning circuit 93, the vertical scanning circuit 93 shifts a pixel row to which a transfer signal PTX, a reset signal PRES, and a row selection signal PSEL are outputted to the next pixel row.

It should be noted that a power supply and a GND are shared by the respective pixels. For this reason, when a voltage level of the power supply and the GND changes during readout of signal electrical charges in a selected pixel row, a power level of the signal electrical charges in respective pixels in the selected pixel row changes all at once. In this case, when the voltage level of the power supply and the GND changes during scanning of one frame, horizontal-striped pattern noise arises in a picked-up image because an amount of change in the voltage level differs according to respective pixel rows.

If the amount of change in the voltage level of the power supply and the GND is not periodical but random in the individual selected rows, the horizontal-striped pattern noise also arises randomly. Examples of methods to correct for such horizontal-striped pattern noise include an offset correction in which an average value of noise voltages of pixels in individual rows in the reference pixel region is calculated, and the average value is subtracted from signal electrical charges in individual rows in the effective pixel region.

As a general image sensor, an image sensor in which a reference pixel region is provided adjacent to one of four sides of an effective pixel region, or an image sensor in which reference pixel regions are provided adjacent to perpendicular two sides of four sides of an effective pixel region is widely used. In such an image sensor, if the amount of change in the level of respective pixels in a selected pixel row is the same, the horizontal-striped pattern noise can be suitably corrected for by the offset correction using the average value of the noise voltages in the reference pixel region.

However, a wiring length from the power supply and the GND to individual pixels differs according to a layout of power lines and GND lines in the image sensor, and a wiring impedance differs according to pixels.

Namely, the longer the wiring length from the power supply and the GND to a pixel, the greater the wiring impedance on the pixel is, the more greatly the pixel is affected by variations in the voltage level of the power supply and the GND, and the higher the noise voltage is. Generally, in a case where the power supply and the GND are supplied from the left side in the image sensor, the wiring lengths to the right side pixels are longer, and the noise voltages thereof are higher. In other words, the noise voltage slopes upward or downward.

Thus, when the noise voltage differs according to the horizontal positions, if the offset correction using the average value of the noise voltages is carried out, only a low degree of effectiveness can be obtained in the effective pixel region away from a reference pixel region although a high degree of effectiveness can be obtained in the effective pixel region close to a reference pixel region.

To solve this problem, a CCD image pickup apparatus in which OB units (optical black units: reference pixel regions) are disposed above and below an effective pixel region, that is, on opposing two sides of the effective pixel region has been proposed in Japanese Laid-Open Patent Publication (Kokai) No. H06-078224.

In the COD image pickup apparatus disclosed in Japanese Laid-Open Patent Publication (Kokai) No. H06-078224, the noise voltage of the effective pixel region is calculated in an estimating manner based on the noise voltage of the OB units disposed adjacent to the opposing two sides of the effective pixel region, and the calculated noise voltage is subtracted from an image voltage signal to carry out a correction.

In this case, because the noise voltage used for the correction is obtained from the two OB units disposed adjacent to the opposing two sides of the effective pixel region, the correction can be more suitably carried out even in a case where the noise voltage changes in one readout direction.

In a case where the arrangement disclosed in Japanese Laid-Open Patent Publication (Kokai) No. H06-078224 specific to the CCD image pickup apparatus is applied to a CMOS sensor, an arrangement as shown in FIG. 10 can be envisaged. Specifically, a left OB unit (first reference pixel region) 1002*a* and a right OB unit (second reference pixel region) 1002*b* are disposed on, for example, horizontally opposing two sides of four sides of an effective pixel region 1001.

At each readout of pixel signals in one row (1H), noise components in the effective pixel region 1001 are estimated from pixel signals of the left and right OB units 1002*a* and 1002*b*, and respective pixel signals in the effective pixel region 1001 are corrected.

Referring now to a timing chart of FIG. 11, a detailed description will be given of scanning control in a case where a general method to scan pixel signals in a CMOS sensor is applied to the CMOS sensor shown in FIG. 10. It should be noted that in the exemplary arrangement of the CMOS sensor shown in FIG. 10, a horizontal scanning start pulse signal PHST is inputted from the left end of the CMOS sensor 1000.

In response to the input of a vertical scanning pulse signal PV, not shown, to a vertical scanning circuit 1003 (t1 to t2 in FIG. 11), a pixel row in which readout of pixel signals is to be carried out is selected. Various control signals, not shown, are transmitted as necessary from the vertical scanning circuit 1003 (t2 to t3), and pixel signals of respective pixels in the selected row are read out all at once and vertically transferred to and held in the line memories C1 to Cn in respective columns.

After that, when a horizontal scanning start pulse signal PHST is inputted as a horizontal scanning start signal to DFF1 (t3), first, an active pulse is outputted from DFF1 to a horizontal scanning switch Q1 in synchronization with the input of a horizontal scanning pulse PH (t4 to t6). As a result, the pixel signals held in the line memory C1 corresponding to the left-end pixel column are read out to a horizontal output line 1005 and horizontally transferred.

After that, the horizontal scanning start pulse signal PHST is shift-transferred to DFF2 to DFFn, whereby the pixel signals held in the line memories C2 to Cn corresponding to the respective pixel columns are read out in order to the horizontal output line 1005 and horizontally transferred in synchronization with the input of the horizontal scanning pulse PH (t6 to t12). At t13 and afterward, the same operation as at t1 to t12 is repeatedly carried out for the next and subsequent pixel rows, so that scanning of pixel signals in one frame is carried out.

It should be noted that in the present specification, the term "scanning" is used as a term encompassing both vertical scanning and horizontal scanning. The term "vertical scanning" is used as a term encompassing both readout of pixel signals from pixels and vertical transfer thereof. The term "horizontal scanning" is used as a term encompassing both readout of pixel signals from the line memories C1 to Cn and horizontal transfer thereof.

As described above, in the general pixel signal scanning method in the CMOS sensor, pixel signals in a selected pixel row are vertically transferred all at once and temporarily held in the line memories in respective columns. Then, the held pixel signals are sequentially read out to the horizontal output line and horizontally transferred from the line memory at one end toward the line memory at the other end.

In a case where a reference pixel region is disposed adjacent to one side of an effective pixel region, readout of pixel signals from the line memories is started from a column corresponding to the leading end of the pixel unit, so that pixel signals in the reference pixel region for the offset correction are read out before pixel signals in the effective pixel region.

Thus, in this case, at least while pixel signals in the reference pixel region are being read out, calculation of offset correction values can be started in the image processing circuit, and thereafter, the offset correction can be promptly carried out for the subsequently read-out pixel signals in the effective pixel region. Moreover, storage capacity of the image processing circuit required for the offset correction processing has only to be such a capacity as to store the pixel signals in the reference pixel region.

However, in a case where reference pixel regions are disposed adjacent to two opposing sides of an effective pixel region, and correction processing is carried out on signals in the reference pixel regions based on correction values calculated in an estimating manner using signals in all the disposed reference pixel regions, the correction processing cannot be efficiently carried out, and the storage capacity of the image processing circuit required for the correction processing must be large in the conventional pixel signal scanning method.

Namely, to properly carry out the correction processing based on noise voltages in the two reference pixel regions disposed adjacent to the two opposing sides of the effective pixel region, pixel signals in all the pixels in one row must be stored in the memory of the image processing circuit.

In other words, unless pixel signals in all the pixels in one row are stored in the memory of the image processing circuit, the correction processing cannot be started. Moreover, the storage capacity of the image processing circuit required for the correction processing has to be such a capacity as to store pixel signals in all the pixels in one row of the effective pixel region and the two reference pixel regions, which requires high cost.

In recent years, higher image quality, higher-speed continuous shooting, pickup of moving images, and so on have been demanded of image pickup apparatuses, and also, there has been an increasing demand to speed up the above described correction processing on noise components.

SUMMARY OF THE INVENTION

The present invention provides an image pickup sensor, a driving method therefor, and an image pickup apparatus, which can properly carry out correction processing on noise components at high speed without bringing about an increase in cost.

Accordingly, in a first aspect of the present invention, there is provided an image pickup sensor comprising an effective pixel region in which pixels for obtaining image pickup signals used as a picked-up image are arranged, a plurality of reference pixel regions in which pixels for obtaining reference signals for the image pickup signals are arranged, and which are disposed adjacent to opposing sides of the effective pixel region, a holding unit adapted to hold the image pickup signals obtained from the effective pixel region and the reference signals obtained from the plurality of reference pixel regions, the image pickup signals and the reference signals vertically scanned on a row-by-row basis, and a horizontal scanning unit adapted to horizontally scan the image pickup signals and the reference signals held by the holding unit, wherein the horizontal scanning unit horizontally scans the reference signals obtained from the plurality of reference pixel regions held by the holding unit before the image pickup signals obtained from the effective pixel region held by the holding unit.

Accordingly, in a second aspect of the present invention, there is provided an image pickup apparatus comprising an image pickup sensor comprising an effective pixel region in which pixels for obtaining image pickup signals used as a picked-up image are arranged, a plurality of reference pixel regions in which pixels for obtaining reference signals for the image pickup signals are arranged, and which are disposed adjacent to opposing sides of the effective pixel region, a holding unit that holds the image pickup signals obtained from the effective pixel region and the reference signals obtained from the plurality of reference pixel regions, the image pickup signals and the reference signals vertically scanned on a row-by-row basis, and a horizontal scanning unit that horizontally scans the image pickup signals and the reference signals held by the holding unit, and a correction unit adapted to correct for noise components of the image pickup signals based on the reference signals, wherein the horizontal scanning unit horizontally scans the reference signals obtained from the plurality of reference pixel regions held by the holding unit before the image pickup signals obtained from the effective pixel region held by the holding unit.

Accordingly, in a third aspect of the present invention, there is provided a method of driving an image pickup sensor comprising an effective pixel region in which pixels for obtaining image pickup signals used as a picked-up image are arranged, a plurality of reference pixel regions in which pixels for obtaining reference signals for the image pickup signals are arranged, and which are disposed adjacent to opposing sides of the effective pixel region, a holding unit that holds the image pickup signals obtained from the effective pixel region and the reference signals obtained from the plurality of reference pixel regions, the image pickup signals and the reference signals vertically scanned on a row-by-row basis, and a horizontal scanning unit that horizontally scans the image pickup signals and the reference signals held by the holding unit, wherein the horizontal scanning unit horizontally scans the reference signals obtained from the plurality of reference pixel regions held by the holding unit before the image pickup signals obtained from the effective pixel region held by the holding unit.

According to the present invention, in a case where the noise components of pixel signals of the effective pixel region are corrected for using pixel signals of the plurality of reference pixel regions, it is possible to swiftly carry out correction processing on the noise components without increasing the storage capacity.

Further features of the present invention will become apparent from the following description of exemplary embodiments (with reference to the attached drawings).

DESCRIPTION OF THE EMBODIMENTS

Figure 1:
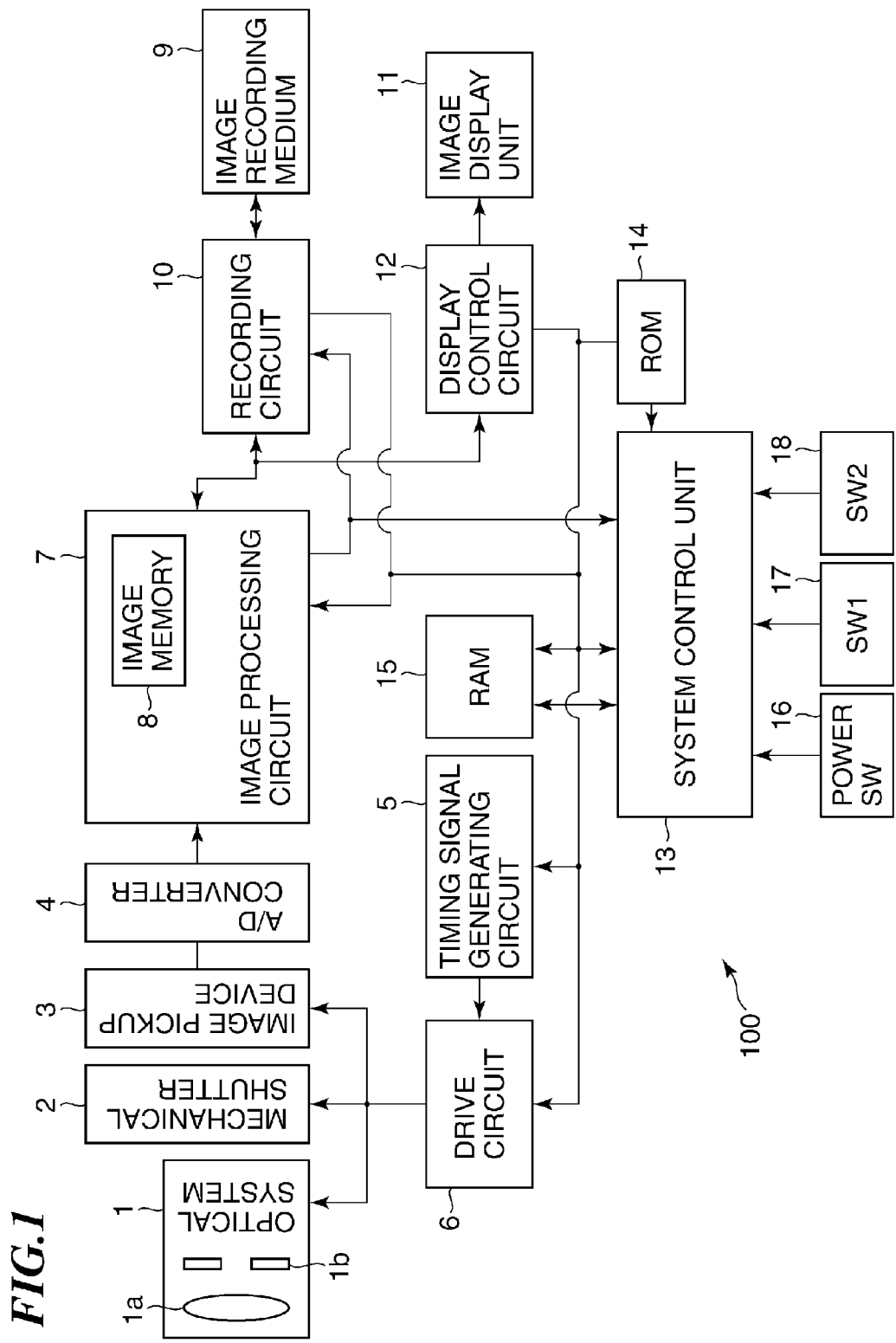
FIG. 1 is a block diagram schematically showing an overall arrangement of an image pickup apparatus according to first to third embodiments of the present invention.

The present invention will now be described in detail with reference to the drawings showing preferred embodiments thereof. FIG. 1 is a block diagram schematically showing an overall arrangement of an image pickup apparatus according to first to third embodiments of the present invention.

The image pickup apparatus 100 in FIG. 1 has an optical system 1 having a lens 1a and an aperture 1b, a mechanical shutter 2, an image pickup device 3 as an image pickup sensor, and an A/D converter 4 that converts analog signals into digital image signals. The image pickup sensor 3 is implemented by a CMOS sensor having a scanning mechanism of an XY address scanning type.

Also, the image pickup apparatus 100 has a timing signal generating circuit 5 that generates timing signals for use in driving the image pickup device 3 and the A/D converter 4, and a drive circuit 6 that drives the optical system 1, the mechanical shutter 2, and the image pickup device 3.

The timing signal generating circuit 5 generates clock signals as well as various timing signals such as a horizontal scanning start pulse signal PHST and a horizontal scanning pulse signal PH, described later. The drive circuit 6 controls scanning operation of pixel signals in the image pickup sensor 3, described later, under the control of a system control unit 13.

Also, the image pickup apparatus 100 has an image processing circuit 7 that carries out various kinds of image processing such as correction processing on image pickup signals, an image memory 8 that stores image data subjected to image processing, and an image recording medium 9 that is removable from the image pickup apparatus 100.

Further, the image pickup apparatus 100 has a recording circuit 10 that records image data subjected to image processing in the image recording medium 9, and an image display unit 11 that displays image data subjected to image processing. Also, the image pickup apparatus 100 has a display control circuit 12 that controls an image display operation of the image display unit 11. Further, the image pickup apparatus 100 has the system control unit 13 that controls the overall operation of the image pickup apparatus 100, a nonvolatile memory (ROM) 14, and a volatile memory (RAM) 15.

The ROM 14 stores programs to be executed by the system control unit 13, control data such as parameters and tables for use in executing the programs, and data for use in various kinds of correction on image signals. It should be noted that the ROM 14 also stores an application program for controlling scanning of pixel signals shown in timing charts of FIGS. 3, 5 to 7, described later.

The RAM 15 is used as a work area in which, for example, programs to be executed, control data, correction data, and so on are loaded. It should be noted that a power switch 16 and a first switch 17 and a second switch 18 turned on and off in response to depression of the mechanical shutter 2 are connected to the system control unit 13.

Next, a description will be given of an image pickup operation of the image pickup apparatus 100. A subject optical image incident from the lens 1a of the optical system 1 is formed on the image pickup device 3. The image pickup device 3 carries out photoelectric conversion of the subject optical image into electronic image signals (pixel signals) and outputs the same. When the mechanical shutter 2 is depressed to a first depth, and the first switch 17 is turned on, the drive circuit 6 drives the aperture 1b and the lens 1a of the optical system 1 to carry out automatic exposure control, automatic focusing control, and so on under the control of the system control unit 13.

When the mechanical shutter 2 is depressed to a second depth, and the second switch 18 is turned on, the drive circuit 6 controls scanning of pixel signals in the image pickup device 3 according to timing signals from the timing generating circuit 5 under the control of the system control unit 13. Analog pixel signals subjected to scanning are converted into digital signals by the A/D converter 4 and outputted as image data to the image processing circuit 7.

The image processing circuit 7 carries out calculation of various correction values, and various kinds of image processing such as correction, color conversion, white balance, gamma correction, resolution conversion, image compression on image data under the control of the system control unit 13.

An image memory 8 incorporated in the image processing circuit 7 is used to temporarily store image data being subjected to image processing, and store image data having been subjected to image processing. Image data having been subjected to image processing by the image processing circuit 7 is converted into data (for example, file system data having a hierarchical structure) suitable for the image recording medium 9 by the recording circuit 10 and recorded in the image recording medium 9.

Also, image data having been subjected to image processing is converted into signals (for example, NTSC analog signals) suitable for the image display unit 11 by the display control circuit 12 and displayed on the image display unit 11. Moreover, in response to a request from the system control unit 13, the image processing circuit 7 outputs image data generated in the course of image processing and information related thereto to the system control unit 13. Examples of the information related to image data include information on a spatial frequency of an image, an average value in a designated region, an amount of data of a compressed image.

In response to a request from the system control unit 13, the recording circuit 10 outputs information such as the type of the image recording medium 9 and the amount of free space in the image recording medium 9 to the system control unit 13. Also, the recording circuit 10 reads image data from the image recording medium 9 according to a control signal from the system control unit 13.

The image processing circuit 7 decompresses compressed image data and stores the decompressed image data in the image memory 8 according to a control signal from the system control unit 13. The image data stored in the image memory 8 is subjected to resolution conversion processing by the image processing circuit 7, converted into signals suitable for the image display unit 11, and displayed on the image display unit 11.

Figure 2:
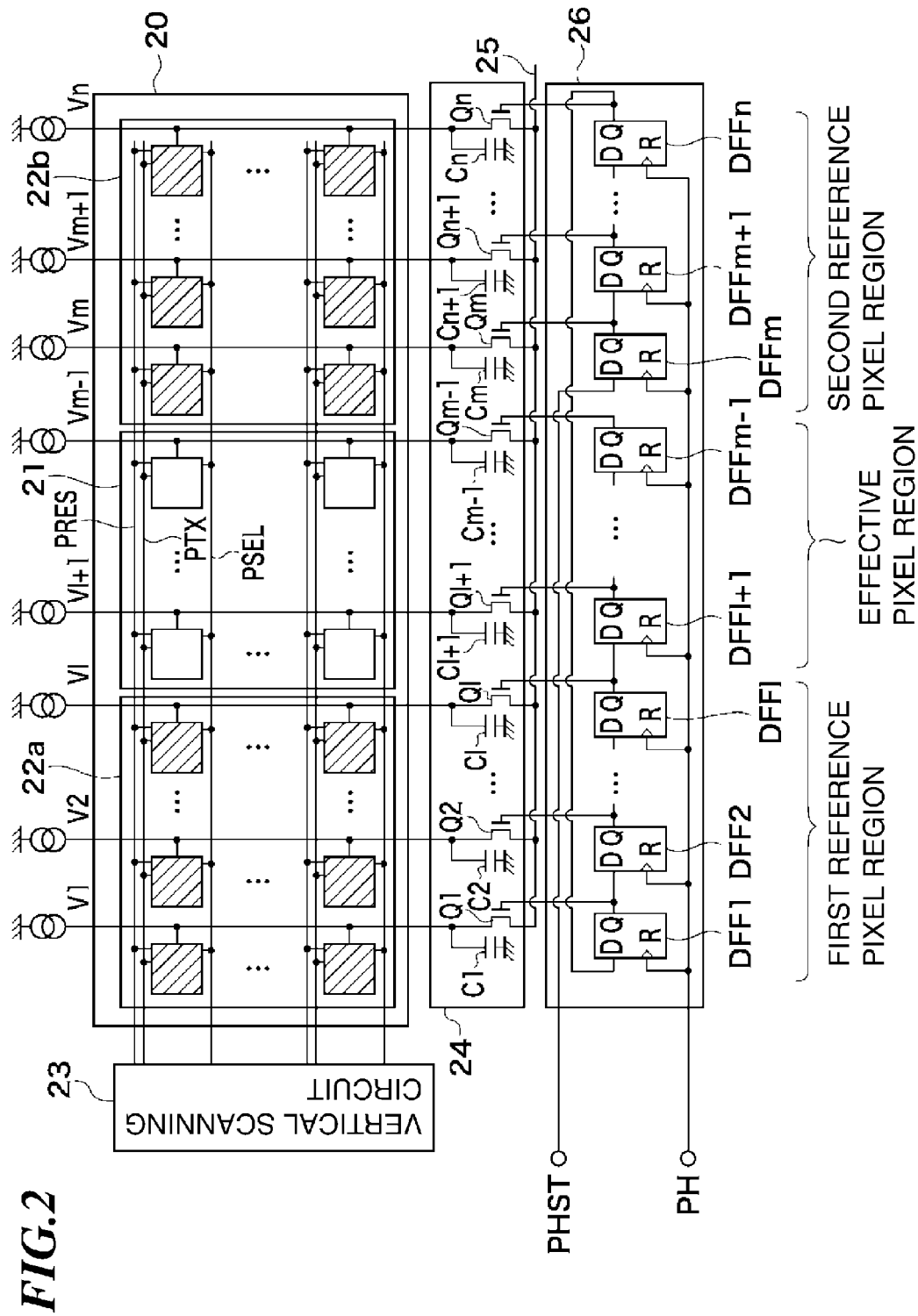
FIG. 2 is a circuit diagram schematically showing an arrangement of an image pickup device (CMOS sensor) according to the first embodiment.
Figure 3:
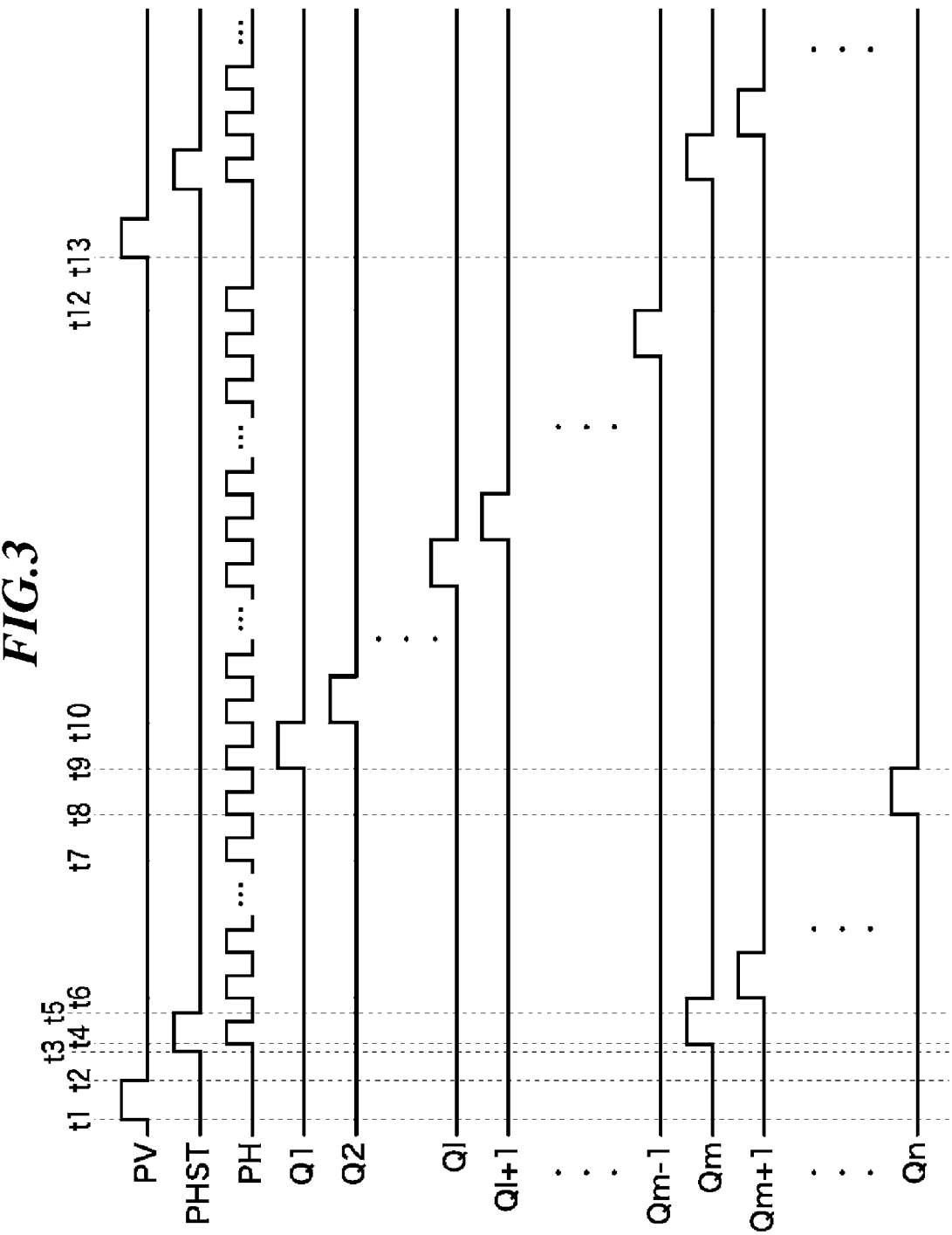
FIG. 3 is a timing chart showing driving for horizontal scanning according to the first embodiment.
Figure 4:
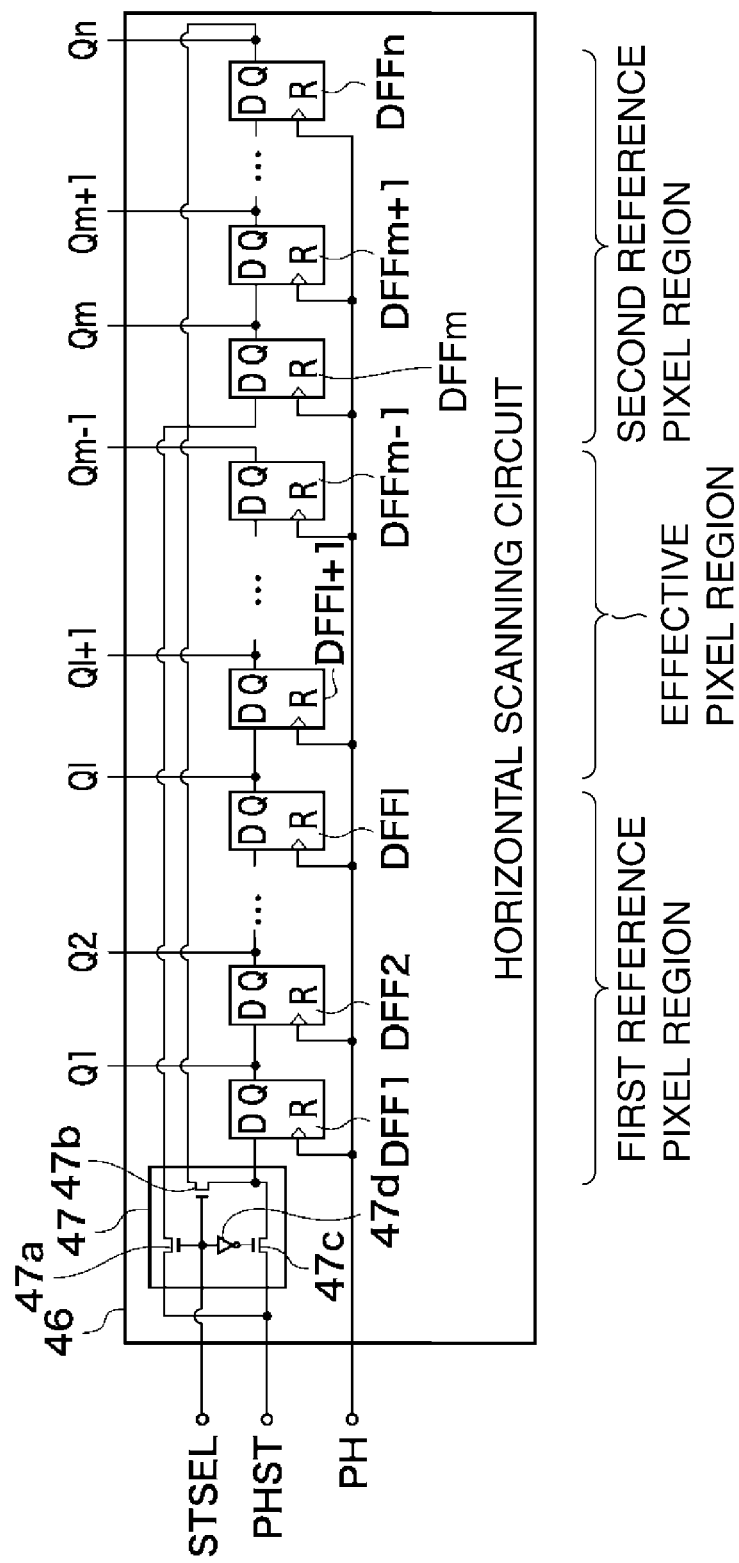
FIG. 4 is a circuit diagram schematically showing an arrangement of a horizontal scanning circuit according to the second embodiment of the present invention.

Referring next to FIGS. 2 and 3, a description will be given of the first embodiment of the present invention. FIG. 2 is a circuit diagram schematically showing an arrangement of the image pickup device 3 according to the first embodiment.

The image pickup device 3 has an photoelectric converting function, a charge accumulating function, and a charge scanning function, which is realized by an XY address scheme. Namely, the image pickup device 3 is implemented by a MOS type image sensor, specifically, a CMOS sensor (the same holds for the second and third embodiments).

Figure 8:
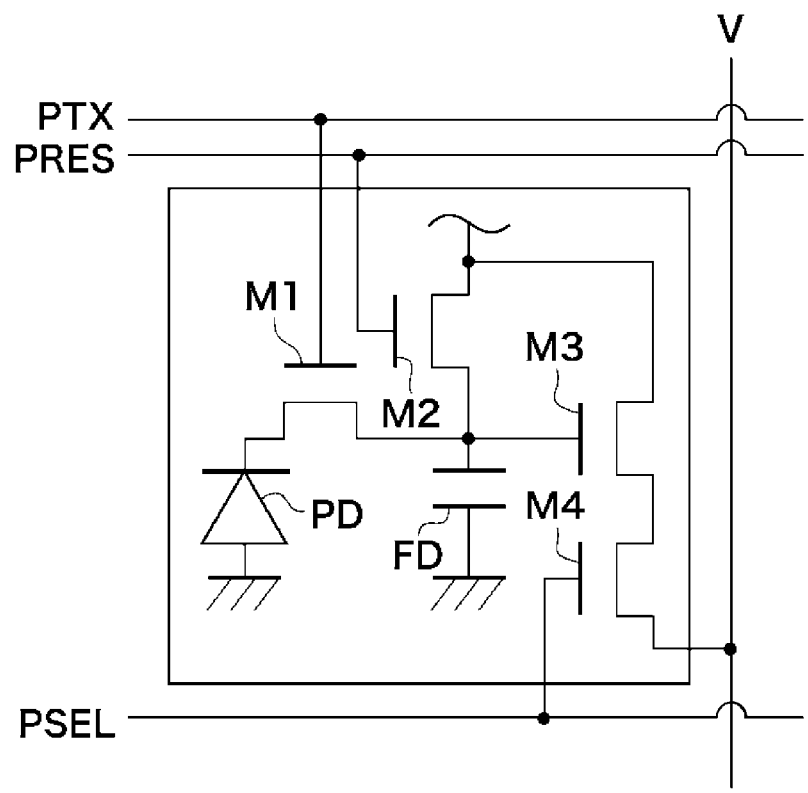
FIG. 8 is a circuit diagram schematically showing a general arrangement of a pixel in the CMOS sensor.
Figure 9:
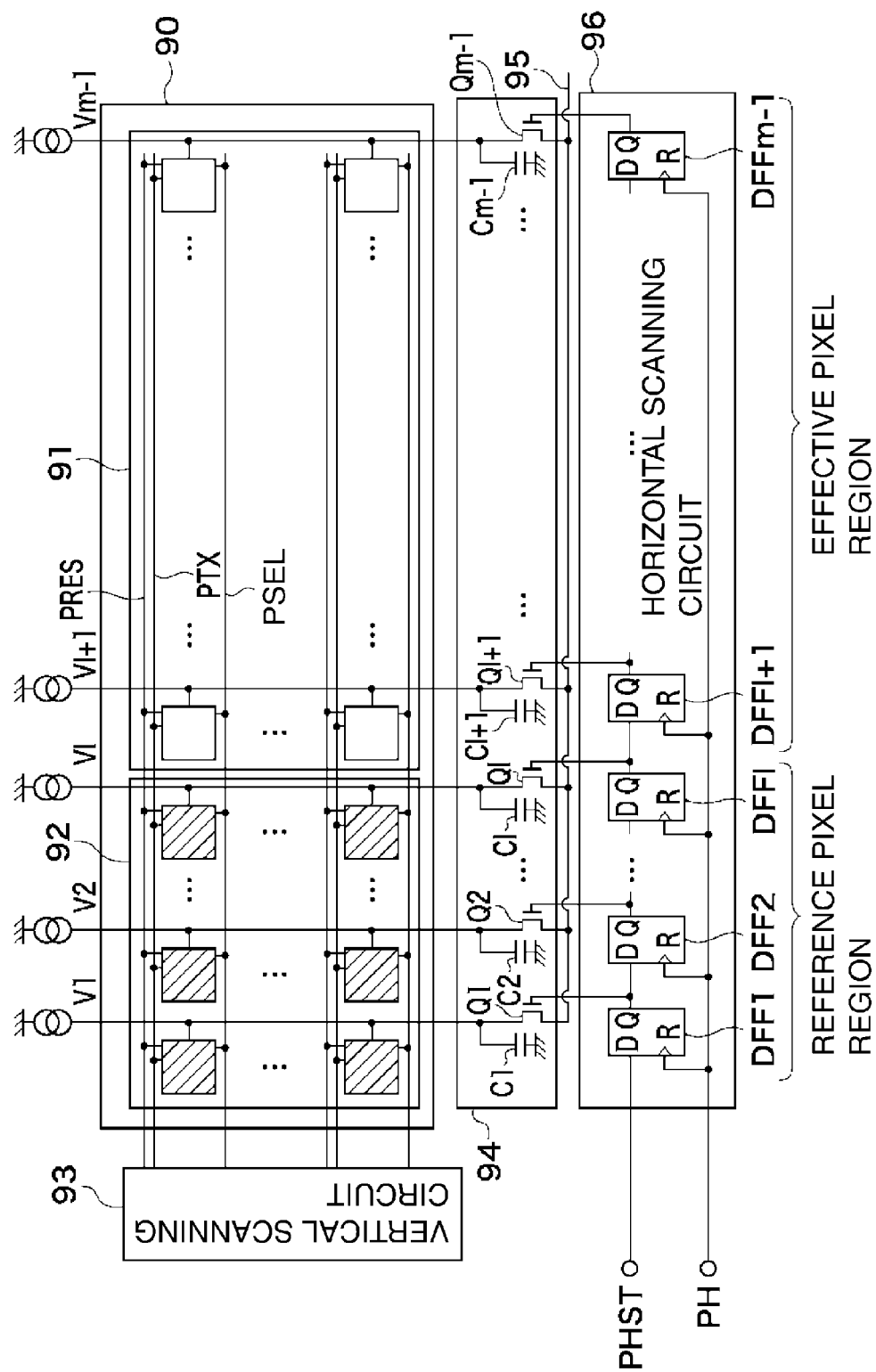
FIG. 9 is a circuit diagram schematically showing an outline of a general arrangement of the CMOS sensor (in a case where there is one reference pixel region)

The photoelectric converting function and the charge accumulating function of the image pickup device 3 are realized by a pixel unit 20. In the pixel unit 20, pixels shown in FIG. 8 described above are arranged in a matrix. The pixel unit 20 is comprised of an effective pixel region 21, and a first reference pixel region 22a and a second reference pixel region 22b that are adjacent to left and right sides (opposing sides) of the effective pixel region 21.

The respective pixels in the first reference pixel region 22a and the second reference pixel region 22b are light-blocking pixels shielded from light by a light shield member such as a metallic film. It should be noted that the pixels in the first reference pixel region 22a and the second reference pixel region 22b may not be light-blocking pixels, but may be non-photosensitive pixels that do not have photodiodes and do not have a photoelectric converting function.

Signal charges (pixel signals and image pickup signals) obtained from the effective pixel region 21 are actually used as a picked-up image reflecting a subject. Pixel signals obtained from the first reference pixel region 22a and the second reference pixel region 22b are used as reference signals for pixel signals obtained from the effective pixel region 21. Namely, the pixel signals obtained from the first reference pixel region 22a and the second reference pixel region 22b are used to specify black levels of pixel signals obtained from the effective pixel region 21, levels of noise components, and so on.

It should be noted that all the pixels in the first reference pixel region 22a and the second reference pixel region 22b should not necessarily be the above-mentioned light-blocking pixels or non-photosensitive pixels, but light-blocking pixels and non-photosensitive pixels may be mixed in the first reference pixel region 22a and the second reference pixel region 22b; for example, rows or columns of light-blocking pixels and rows or columns of non-photosensitive pixels may be alternately arranged. In the present embodiment, however, it is preferred that the forms of the pixels in the first reference pixel region 22a and the second reference pixel region 22b are the same because an object of the present embodiment is to correct for electric pattern noise arising from variations in power of a power line and a GND line.

A vertical scanning circuit 23 outputs control pulse signals such as a pixel transfer signal PTX (corresponding to a vertical scanning pulse signal PV, described later), a row selection signal PSEL, and a pixel reset signal PRES described above with reference to FIG. 8 to the pixel unit 20 as necessary.

In this instance, pixel transfer switches M1 of respective pixels arranged in the same row among a plurality of pixels arranged in a matrix are commonly controlled by a vertical scanning pulse signal PV. Also, reset switches M2 of respective pixels arranged in the same row are commonly controlled by a pixel reset signal PRES. Further, row selection switches M4 of respective pixels arranged in the same row are commonly controlled by a row selection signal PSEL.

Namely, the switches of respective pixels arranged in the same row are controlled in the same timing, and respective pixel signals in the same row are vertically transferred all at once in the same timing on a row-by-row basis from vertical output lines V1 to Vn to line memories C1 to Cn of a signal holding unit 24.

It should be noted that pixels arranged in the same columns are commonly connected to the respective vertical output lines V1 to Vn. The line memories C1 to Cn are commonly connected to a horizontal output line 25 via respective horizontal scanning switches Q1 to Qn. Gate terminals of the horizontal scanning switches Q1 to Qn are connected to respective Q output terminals of DFF1 to DFFn of a horizontal scanning circuit 26.

DFF1 to DFFn of the horizontal scanning circuit 26 have D input terminals thereof connected in a cascade to the Q output terminals of DFF1 to DFFn in the preceding stages, and are configured as shift registers.

However, the Q output terminal of DFFn in the last stage is connected to the D input terminal of DFF1 in the first stage. Moreover, the Q output terminal of DFFm−1 corresponding to the last pixel column in the effective pixel region 21 is not connected to the D input terminal of DFFm corresponding to the first pixel column in the second reference pixel region 22b in the next stage, and a horizontal scanning start pulse signal PHST is inputted to the D input terminal of DFFm.

In other words, the horizontal scanning circuit 26 has a first shift register comprised of DFF1 to DFFm−1 that output readout signals for reading out pixel signals held in the line memories C1 to Cn, and a second shift register comprised of DFFm to DFFn. The Q output terminal (signal output terminal) of the second shift register and the D input terminal (signal input terminal) of the first shift register are connected to each other.

Horizontal scanning of pixel signals is started in accordance with the horizontal scanning start pulse signal (horizontal scanning start signal) PHST inputted to the signal input terminal of the second shift register, that is, the D input terminal of DFFm, and is carried out in synchronization with a horizontal scanning pulse signal PH.

In this instance, the horizontal scanning start pulse signal PHST is shifted from the Q output terminal of DFF to the D input terminal of DFF in the next stage in the cascade connection mentioned above, and pulse signals from the respective Q output terminals are sequentially inputted to the gate terminals of the horizontal scanning switches Q1 to Qn.

Thus, horizontal scanning of pixel signals is carried out in the following order: the second reference pixel region 22b→the first reference pixel region 22a→the effective pixel region 21. In this case, if the second reference pixel region 22b, the first reference pixel region 22a, and the effective pixel region 21 are looked at independently, pixel signals in each region are horizontally scanned sequentially from the left column toward the right column.

As described above, the first embodiment is characterized in that horizontal scanning of pixel signals is carried out in the following order: the second reference pixel region 22b→the first reference pixel region 22a→the effective pixel region 21, not in the following order as in the prior art: the first reference pixel region 22a→the effective pixel region 21→the second reference pixel region 22b. It should be noted that the second and third embodiments also have this characteristic.

Referring next to FIG. 3, a detailed description will be given of operation timing of horizontal scanning of pixel signals in the first embodiment. Here, a description will be given mainly of operation timing of horizontal scanning in a pixel array in a pixel row selected for scanning (the same holds for descriptions given by referring to FIGS. 5 and 6).

The drive circuit 6 causes the vertical scanning circuit 23 to output a vertical scanning pulse signal PV to the pixel unit 20 (t1 to t2). Then, the vertical scanning circuit 23 outputs various control signals as necessary to the respective pixels in the selected row (t2 to t3). As a result, pixel signals of the respective pixels in the selected row are vertically transferred all at once to the line memories C1 to Cn via the vertical output lines V1 to Vn in the respective columns, and held in the line memories C1 to Cn.

After that, the drive circuit 6 causes the horizontal scanning circuit 26 to input a horizontal scanning start pulse signal PHST to DFFm in the mth column corresponding to the first column in the second reference pixel region 22b (t3 to t5). As a result, the horizontal scanning switch Qm in the mth column is turned on (t4) at the beginning, and signal readout to the horizontal output line 25 and horizontal transfer on the signal output line 25, that is, horizontal scanning is started from the pixel signal held in the line memory Cm in the mth column.

Following the signal readout from the line memory Cm and the horizontal transfer (t4 to t6), signal readout and horizontal transfer are carried out in order on a column-by-column basis from the line memory Cm+1 to the line memory Cn, so that the signal readout and the horizontal transfer for the second reference pixel region 22b are completed (t6 to t8: Qm+1 to Qn).

As described above, the Q output terminal of DFFn in the nth column is connected to the D input terminal of DFF1 in the first column. Thus, at the same time when the horizontal scanning switch Qn in the nth column is turned on, a H-level (H: High) signal is inputted to the D input terminal of DFF1 in the first column.

As a result, upon completion of the horizontal scanning in the second reference pixel region 22b, the horizontal scanning switch Q1 in the first column associated with the first reference pixel region 22a is turned on (t9 to t10), and the pixel signal held in the line memory C1 in the first column is read out to the horizontal output line 25 and horizontally transferred. Thereafter, horizontal scanning is carried out on a column-by-column basis up to the pixel signal held in the line memory Cm−1 in the m−1th column, which is the last column associated with the effective pixel region 21 (t10 to t12: Q2 to Qm−1).

The pixel signals of the first and second reference pixel regions 22a and 22b subjected to horizontal scanning are used for the image processing circuit 7 to calculate correction coefficients and correction values for correcting for noise components of pixel signals of the effective pixel region 21.

In the above described way, in the first embodiment, horizontal scanning is carried out in the following order: the second reference pixel region 22b→the first reference pixel region 22a→the effective pixel region 21. In other words, in the first embodiment, horizontal scanning in the first and second reference pixel regions 22a and 22b is carried out prior to horizontal scanning in the effective pixel region 21.

Thus, at least while horizontal scanning in rows to be corrected in the effective pixel region 21 is being carried out, calculation of noise correction values can be started, and hence even in the image pickup apparatus that scans pixel signals at high speed, the image processing circuit 7 is able to carry out noise correction processing with high real-time responsiveness.

Moreover, to calculate correction coefficients and correction values that are to be used for the image processing circuit 7 to correct for noise components of pixel signals in the effective pixel region 21, it is only necessary to prepare a memory having such a storage capacity as to be able to store pixel signals in one row of the first and second reference pixel regions 22a and 22b.

Namely, in the first embodiment, the storage capacity of a memory for calculating correction coefficients and correction levels can be reduced by a capacity required to store pixel signals in one row of the effective pixel region 21 as compared with the prior art. The above described effects obtained in the first embodiment can be obtained similarly in the second and third embodiments as well.

In the first embodiment, the following way is devised so as to horizontally scan pixel signals in the following order: the second reference pixel region 22b→the first reference pixel region 22a→the effective pixel region 21. Specifically, the signal output terminal (the Q output terminal of DFFn) of the second shift register (DFFm to the DFFn) and the signal input terminal (the D input terminal of DFF1) of the first shift register (DFF1 to DFFm−1) are directly connected to each other.

Also, in the first embodiment, the horizontal scanning start pulse signal PHST as the horizontal scanning start signal is inputted to the signal input terminal (the D input terminal of DFFm) of the second shift register (DFFm to DFFn).

On the other hand, in the second embodiment, the following way is devised so as to horizontally scan pixel signals in the following order: the second reference pixel region 22b→the first reference pixel region 22a→the effective pixel region 21. Specifically, in the second embodiment, the signal output terminal (the Q output terminal of DFFn) of the second shift register and the signal input terminal (the D input terminal of DFF1) of the first shift register are connected to each other via a horizontal scanning start position selection unit 47.

Moreover, in the second embodiment, by selectively inputting the horizontal scanning start pulse signal PHST to the signal input terminal (the D input terminal of DFFm) of the second register, the horizontal scanning start position selection unit 47 enables horizontal scanning to be started from the second reference pixel region 22b.

However, by selectively inputting the horizontal scanning start pulse signal PHST to the signal input terminal (the D input terminal of DFF1) of the first register, the horizontal scanning start position selection unit 47 also enables horizontal scanning to be started from the first reference pixel region 22a.

It should be noted that three switches 47a, 47b, and 47c included in the horizontal scanning start position selection unit 47 are comprised of NMOS, and turned on when the gate voltage is at H level.

Thus, when a horizontal scanning start position selection signal STSEL inputted to the horizontal scanning start position selection unit 47 is "H", the switches 47a and 47b are turned on, and the switch 47c is turned off by an inverter 47d. As a result, the horizontal scanning start pulse signal PHST is inputted to the second reference pixel region 22b. Also, a Q output signal from DFFn is inputted to the D input terminal of DFF1.

Thus, when the horizontal scanning start position selection signal STSEL is "H", it is possible to carry out horizontal scanning in the following order: the second reference pixel region 22b→the first reference pixel region 22a→the effective pixel region 21 similarly to the first embodiment. This driving pattern corresponds to a timing chart of FIG. 5.

When the horizontal scanning start position selection signal STSEL is at L level (L: Low), the switches 47a and 47b are turned off, and the switch 47c is turned on by the inverter 47d. As a result, the horizontal scanning start pulse signal PHST is inputted to the first reference pixel region 22a. Also, the Q output signal from the DFFn is inhibited from being inputted to the D input terminal of the DFF1.

Thus, when the horizontal scanning start position selection signal STSEL is "L", horizontal scanning is carried out in the following order: the first reference pixel region 22a→the effective pixel region 21, and not carried out on pixel signals in the second reference pixel region 22b. This driving pattern corresponds to a timing chart of FIG. 6.

First, a description will be given of the driving pattern shown in FIG. 5. In the driving pattern shown in FIG. 5, the horizontal scanning start position selection signal STSEL is "H", and the horizontal scanning start pulse signal PHST is inputted to the D input terminal of DFFm in the mth column as the leading column in the second reference pixel region 22b (t3 to t5).

Thus, horizontal scanning is sequentially started from a pixel signal held in the line memory Cm in the mth column corresponding to the first column in the second reference pixel region 22b (t4: Qm). After all the pixel signals in the second reference pixel region 22b are read out (t8: Qn), the pixel signals held in the line memories C1 to C1 corresponding to the leading column (the first column) to the last column (the lth column) in the first reference pixel region 22a are sequentially read out (t9 to t11: Q1 to Ql).

Then, the pixel signals held in the line memories C1+1 to Cm−1 corresponding to the leading column (the l+1th column) to the last column (the m−1th column) in the effective pixel region 21 are sequentially read out (t11 to t12: Ql+1 to Qm−1).

Figure 6:
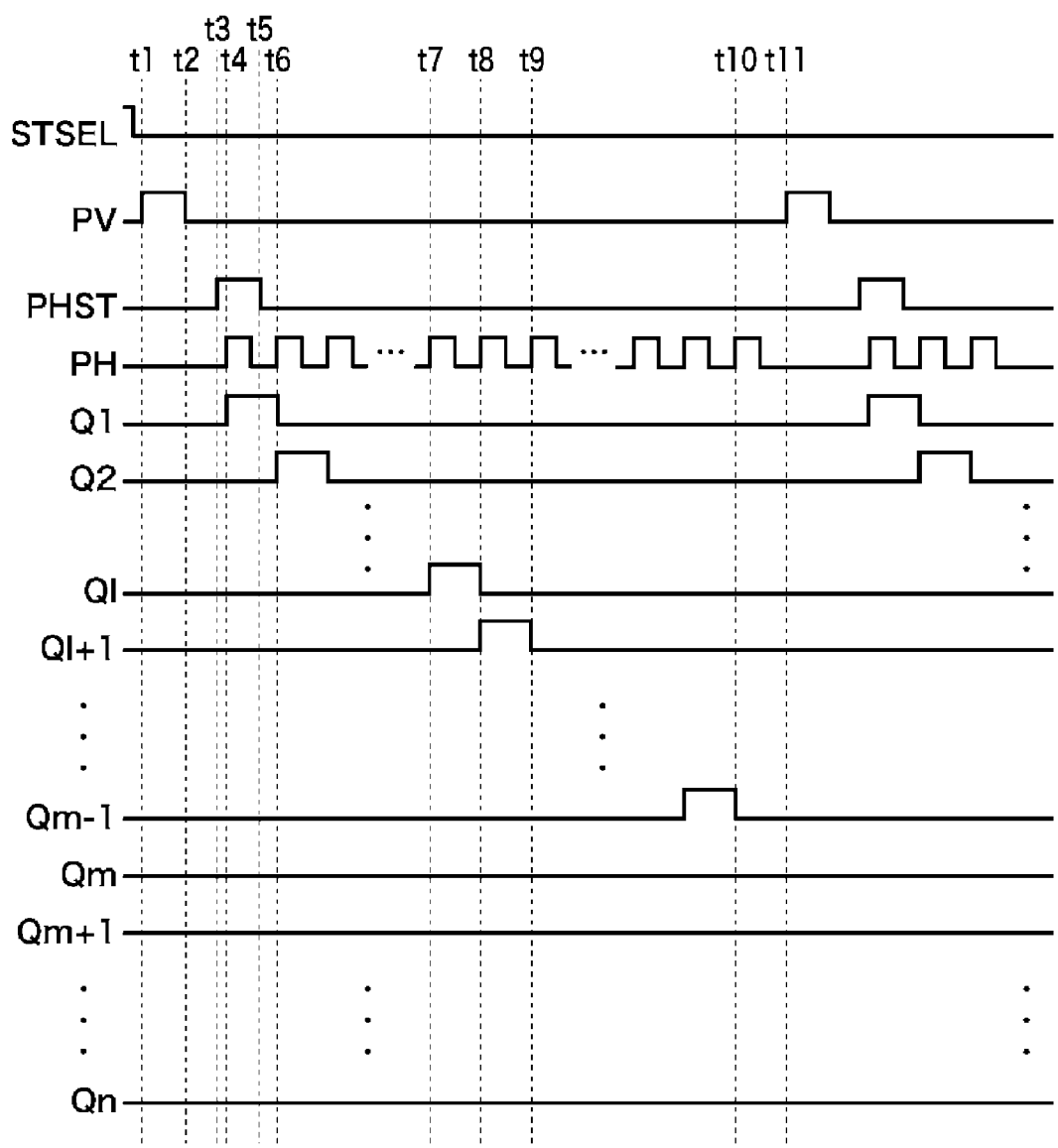
FIG. 6 is a timing chart showing a second driving pattern of horizontal scanning according to the second embodiment.

In the driving pattern shown in FIG. 6, the horizontal scanning start position selection signal STSEL is "L", and the horizontal scanning start pulse signal PHST is inputted to the D input terminal of DFF1 in the first column as the leading column in the first reference pixel region 22a (t3).

Thus, first, the pixel signals held in the line memories C1 to Cl corresponding to the leading column (the first column) to the last column (the lth column) in the first reference pixel region 22a are sequentially read out (t3 to t9: Q1 to Ql). Then, the pixel signals held in the line memories C1+1 to Cm−1 corresponding to the leading column (the l+1th column) to the last column (the m−1th column) in the effective pixel region 21 are sequentially read out (t8 to t10: Ql+1 to Qm−1).

Figure 5:
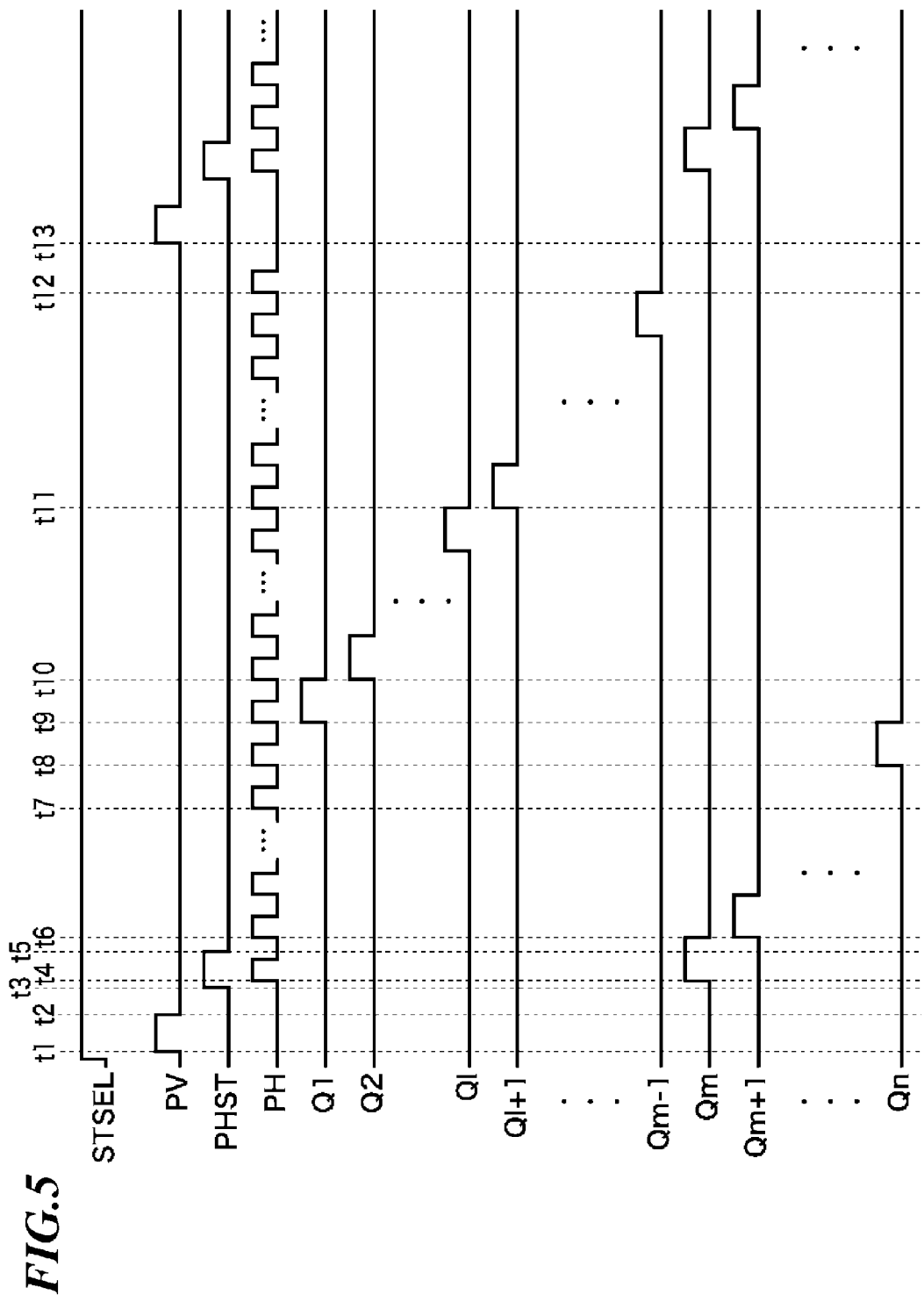
FIG. 5 is a timing chart showing a first driving pattern of horizontal scanning according to the second embodiment.

In the driving pattern shown in FIG. 6, the pixel signals in the second reference pixel region 22b are not read out, but horizontal scanning is completed in earlier timing than the timing of the completion of horizontal scanning in the driving pattern shown in FIG. 5. Thus, the time period required for horizontal scanning can be shortened as compared with the driving pattern shown in FIG. 5.

The driving pattern shown in FIG. 6 can be effectively used when the image pickup apparatus 100 is driven under the following conditions. For example, when a strobe device is connected to the image pickup apparatus 100, large current flows during charging of a secondary battery of the strobe device, which is likely to affect pixel signals in the image pickup apparatus 100. Specifically, electric noise is likely to be superposed on pixel signals in a case where images are picked up during charging of the secondary battery of the strobe device, and there is a high possibility that the level of the noise varies even within a picked-up image of one frame.

Thus, under such drive conditions likely to cause the noise level to vary within a picked-up image of one frame, horizontal scanning is carried out in the driving pattern shown in FIG. 5 so as to carry out the noise correction based on pixel signals from both of the first and second reference pixel regions 22a and 22b.

On the other hand, under drive conditions unlikely to cause the noise level to vary within a picked-up image of one frame, horizontal scanning is carried out in the driving pattern shown in FIG. 6 so as to carry out the noise correction using only pixel signals from the first reference pixel region 22a, that is, a part of the reference pixel regions. This enables noise correction to be started more promptly.

Namely, according to the drive conditions of the image pickup apparatus 100, the system control unit 13 switches between a first horizontal scanning mode in which the horizontal scanning circuit 46 horizontally scans pixel signals in the effective pixel region and the plurality of reference pixel regions, and a second horizontal scanning mode in which the horizontal scanning circuit 46 horizontally scans pixel signals in a part of the plurality of reference pixel regions and the effective pixel region. The mode switching may be manually carried out by a user, or automatically carried out by the system control unit 13 of the image pickup apparatus 100.

Moreover, the mode switching may be carried out according to not only the drive conditions of the image pickup apparatus 100, but also subject conditions in a case where fireworks whose luminance momentarily increases are shot, shooting environmental conditions in a case where the luminance of a subject changes only slightly, but luminance around the subject changes greatly.

In short, according to the conditions under which electric noise is generated, the first horizontal scanning mode and the second horizontal scanning mode can be selected between each other.

By the above described mode switching, unnecessary operations can be prevented from being needlessly carried out, and power consumption can be reduced, which is particularly useful in driving the image pickup apparatus 100 by a secondary battery.

In the first and second embodiments, by separately providing the two shift registers in the horizontal scanning circuit, horizontal scanning of pixel signals is carried out in the following order: the second reference pixel region 22b→the first reference pixel region 22a→the effective pixel region 21.

On the other hand, in the third embodiment, by providing one shift register in the horizontal scanning circuit as in the prior art and carrying out virtual horizontal scanning, horizontal scanning of pixel signals is carried out in the following order: the second reference pixel region 22b→the first reference pixel region 22a→the effective pixel region 21.

Figure 7:
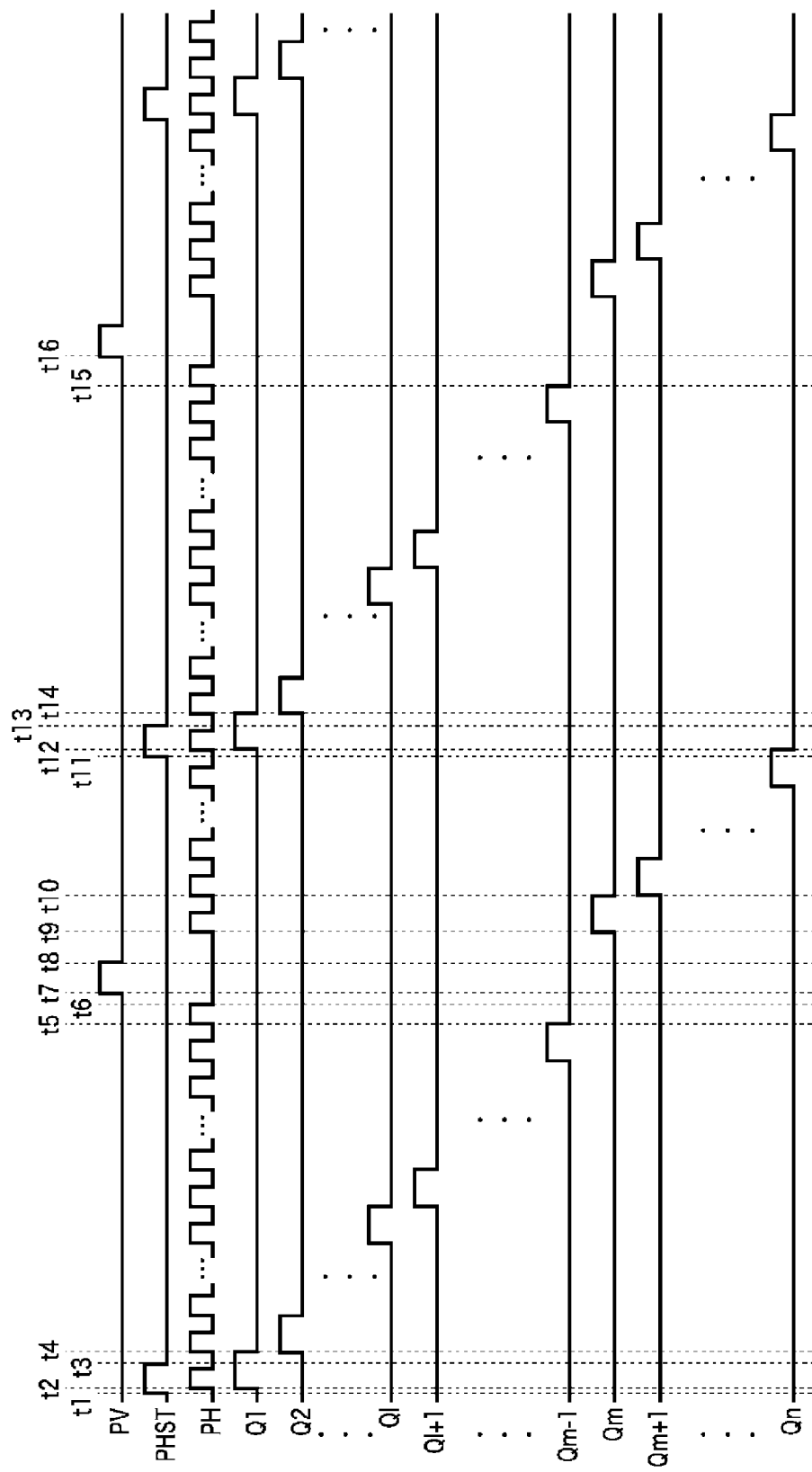
FIG. 7 is a timing chart showing driving for horizontal scanning according to a third embodiment of the present invention.
Figure 10:
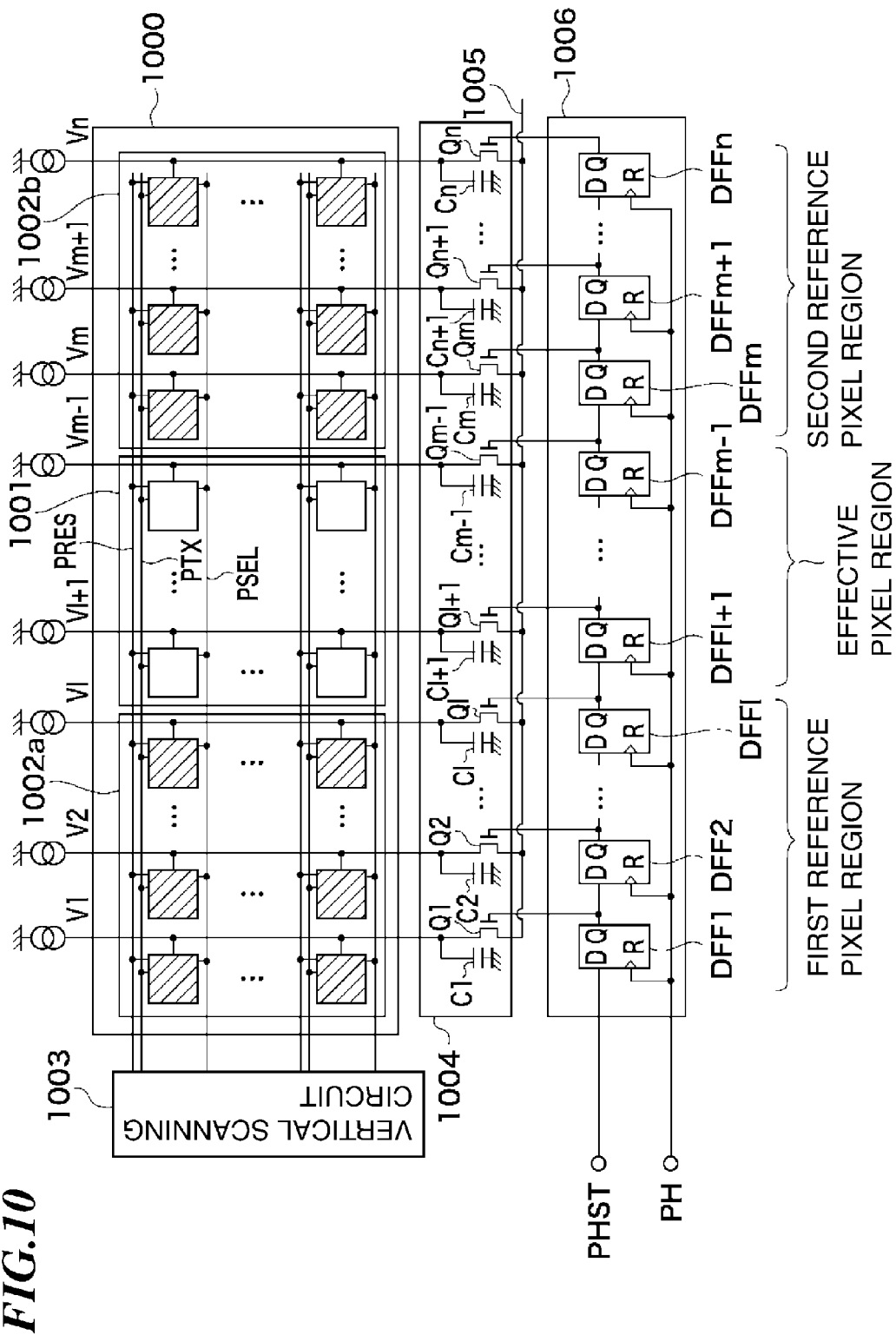
FIG. 10 is a circuit diagram schematically showing an outline of a general arrangement of the CMOS sensor (in a case where there are two reference pixel regions)
Figure 11:
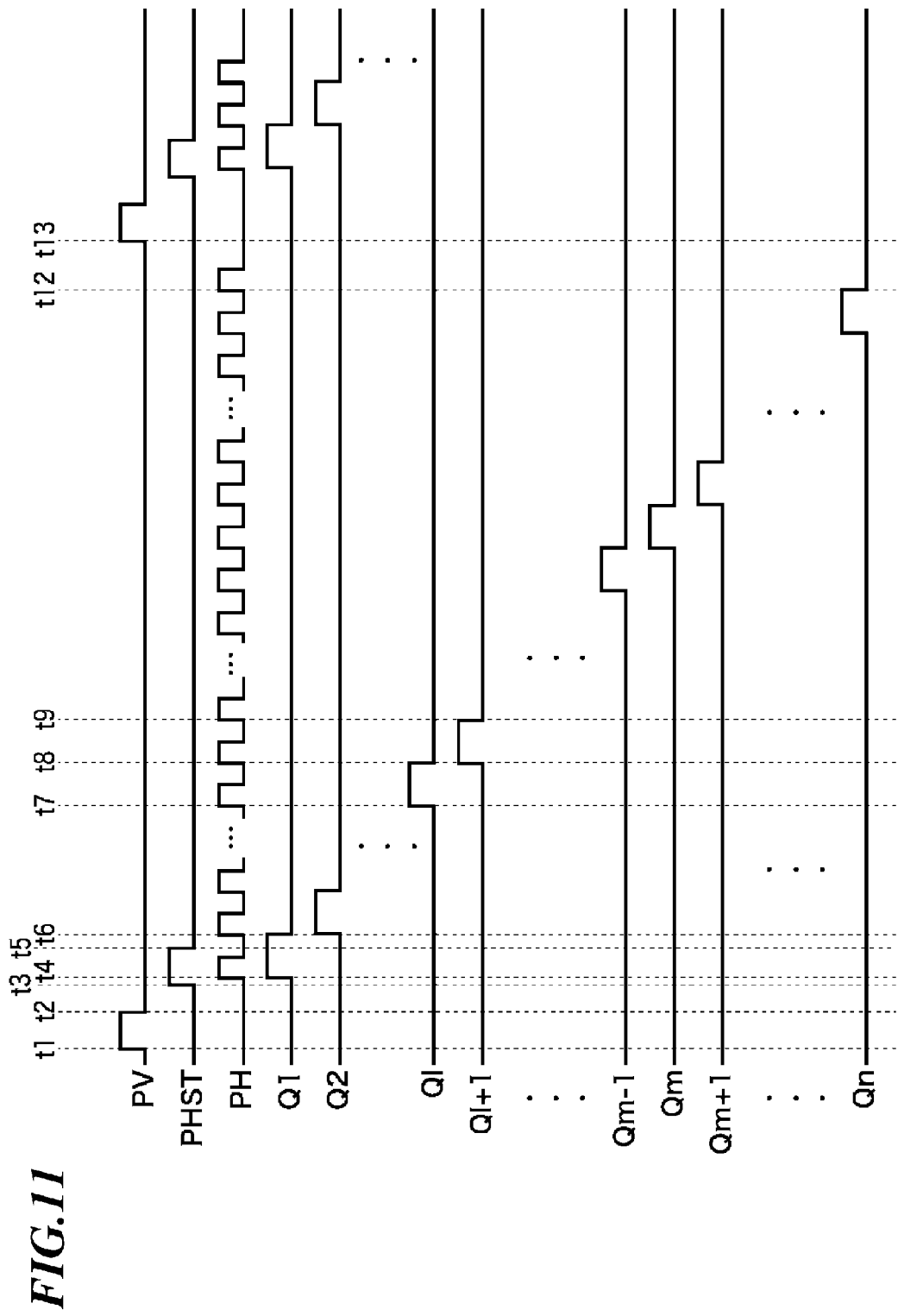
FIG. 11 is a timing chart showing conventional driving for horizontal scanning in the CMOS sensor.

Control of drive for horizontal scanning of pixel signals in the third embodiment is carried out as shown in FIG. 7. In the following description, horizontal scanning of pixel signals in a CMOS sensor (image pickup device 3) arranged as shown in FIG. 10 described above is taken as an example.

Before starting actual horizontal scanning of pixel signals, the drive circuit 6 inputs a horizontal scanning start pulse signal PHST to a horizontal scanning circuit 1006 (t1 to t3) in a state in which a vertical scanning pulse signal PV has not been inputted to a vertical scanning circuit 1003. Specifically, in the third embodiment, in a state in which no pixel signals subjected to vertical scanning are held in any of line memories C1 to Cn, horizontal scanning is virtually started in order from the line memory C1 corresponding to the leading column in a pixel unit 1000.

Then, after completion of the virtual horizontal scanning from the line memory C1 to the line memory Cm−1 corresponding to the last pixel column in an effective pixel region 1001 (t2 to t5), the drive circuit 6 temporarily stops the output of a horizontal scanning pulse signal PH to the horizontal scanning circuit 1006 (t6).

The output of the horizontal scanning pulse signal PH is temporarily stopped so as to erase respective pixel signals in the selected row from the line memories C1 to Cn and so on, and output a vertical scanning pulse signal PV to resume the vertical scanning (the same holds for the first and second embodiments).

After temporarily stopping the output of the horizontal scanning pulse signal PH, the drive circuit 6 causes the vertical scanning circuit 1003 to forcibly set a selected row as a leading row in a pixel region in which signal readout is to be carried out so as to carry out scanning of pixel signals from pixel signals in the leading row in the pixel region in which signal readout is to be carried out. This selecting operation of forcibly setting the selected row is carried out because the selected row is not the leading row in the pixel region in which signal readout is carried out in some cases depending on the timing of stopping the image pickup operation.

However, in the case of still image, the forced selection of a selected row has only to be carried out for the first selected row per one frame (one image). Moreover, in the case of moving images of continuous frames, the forced selection of a selected row has only to be carried out for only the first selected row of the first frame. This means that the virtual horizontal scanning hardly impairs a swiftness of noise correction.

While the output of the horizontal scanning pulse signal PH is temporarily stopped (t7 to t8), the drive circuit 6 causes the vertical scanning circuit 1003 to input a vertical scanning pulse signal PV to the pixel unit 1000. In response to the input of the vertical scanning pulse signal PV, the pixel signals of the respective pixels in the selected row are read out all at once and vertically transferred all at once to the line memories C1 to Cn. Thus, the pixel signals held in the line memories C1 to Cn become substantive signals that reflect a subject optical image, OB signals, and so on and are of significant importance to the image pickup apparatus 100.

Upon selection of the pixel row in which scanning is to be carried out, the drive circuit 6 causes the vertical scanning circuit 1003 to output various control signals as necessary (t8 to t9). Then, the drive circuit 6 causes the horizontal scanning circuit 1006 to resume the output of the horizontal scanning pulse signal PH (t9) after the pixel signals in the selected row are held in the line memories C1 to Cn in the respective columns.

Upon resumption of the output of the horizontal scanning pulse signal PH, the pixel signal held in the line memory Cm corresponding to the leading pixel column in a second reference pixel region 1002b is read out to a horizontal output line 1005 and horizontally transferred (t9 to t10: Qm). After that, the pixel signals held in the line memories Cm+1 to Cn are sequentially read out to the horizontal output line 1005 and horizontally transferred (t9 to t12: Qm+1 to Qn).

It should be noted that the drive circuit 6 inputs a horizontal scanning start pulse signal PHST to the horizontal scanning circuit 1006 in timing with the readout of the pixel signal held in the line memory Cn (t11 to t13). As a result, the pixel signal held in the line memory C1 corresponding to the leading pixel column in the pixel unit 1000 is read out and horizontally transferred (t12 to t14: Q1).

After that, the pixel signals held in from the line memory C2 to the line memory Cm−1 corresponding to the last pixel column in the effective pixel region 1001 are read out and horizontally transferred (t14 to t15:Q2 to Qm−1). Then, upon completion of readout from the line memory Cm−1, the drive circuit 6 stops again the output of the horizontal scanning pulse signal PH to the horizontal scanning circuit 1006. At a time t16 and afterwards, scanning of pixel signals is carried out similarly at t7 to t16.

As described above, in the third embodiment, substantive scanning is started from the second reference pixel region merely by carrying out virtual horizontal scanning without carrying out vertical scanning with respect to the first reference pixel region and the effective pixel region in one row only once during pickup of one still image or one moving image.

Thus, even if the virtual horizontal scanning is carried out in the third embodiment, the same degree of swiftness in noise correction can be obtained as in the first and second embodiments, or rather in the third embodiment, the conventional shift registers can be used, and the advantage thereof is greater. As described above, in the first to third embodiments, horizontal scanning is carried out on pixel signals in the two reference pixel regions before pixel signals in the effective pixel region.

Thus, to correct for noise components of pixel signals in the effective pixel region, the storage capacity for holding pixel signals in the two reference pixel regions and pixel signals in the effective pixel region is not required, but the storage capacity has only to be a capacity for holding pixel signals in the two reference pixel regions. Namely, an increase in cost is not brought about.

Moreover, at least while horizontal scanning is being carried out on pixel signals in the effective pixel region, the calculation processing in which correction values for use in correcting for noise components of pixel signals in the effective pixel region are calculated based on pixel signals in the two reference pixel regions can be started. As a result, the correction processing on the noise components can be properly carried out.

Further, noise components of pixel signals in the effective pixel region can be corrected for using pixel signals in the plurality of reference pixel regions disposed adjacent to opposing sides of the effective pixel region. Thus, even in, for example, a case where the amount of noise differs according to horizontal scanning positions, the correction processing can be swiftly carried out.

It should be noted that the present invention is not limited to the first to third embodiments, but the shift registers constituting the horizontal scanning circuit may be comprised of flip flops such as JK flip-flops other than the D flip-flops.

Moreover, the technical idea according to the first to third embodiments may be applied to image pickup sensors (image sensors) other than the CMOS sensor insofar as the image pickup sensors have a scanning mechanism of an XY address scanning type and are adapted to vertically scan pixel signals in one row all at once.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-302535 filed Nov. 27, 2008 which is hereby incorporated by reference herein in its entirety.

What is claimed is:

1. An image pickup sensor comprising:
  an effective pixel region in which pixels for obtaining image pickup signals used as a picked-up image are arranged;
  first and second reference pixel regions in which pixels for obtaining reference signals for the image pickup signals are arranged, which are disposed adjacent to opposing sides of said effective pixel region, and wherein said first and second reference pixel regions are not adjacent to each other;
  a holding unit adapted to hold the image pickup signals obtained from said effective pixel region and the reference signals obtained from said first and second reference pixel regions, the image pickup signals and the reference signals vertically scanned on a row-by-row basis; and a horizontal scanning unit adapted to horizontally scan the image pickup signals and the reference signals held by said holding unit, wherein said horizontal scanning unit horizontally scans the reference signals obtained from said first reference pixel region held by said holding unit, then horizontally scans the reference signals obtained from said second reference pixel region held by said holding unit, then horizontally scans the image pickup signals obtained from said effective pixel region held by said holding unit.

2. An image pickup sensor according to claim 1, wherein said horizontal scanning unit has a first shift register and a second shift register that output readout signals for reading out the image pickup signals and the reference signals held by said holding unit, a signal output terminal of the second shift register and a signal input terminal of the first shift register are connected to each other, and a horizontal scanning start signal is inputted to a signal input terminal of the second shift register.

3. An image pickup sensor according to claim 1, wherein said horizontal scanning unit has a first shift register and a second shift register that output readout signals for reading out the image pickup signals and the reference signals held by said holding unit, and an input unit that selectively inputs a horizontal scanning start signal to signal input terminals of the first shift register and the second shift register.

4. An image pickup sensor according to claim 1, wherein said horizontal scanning unit has one shift register that outputs readout signals for reading out the image pickup signals and the reference signals held by said holding unit, and after horizontal scanning on one reference pixel region of said plurality of reference pixel regions and said effective pixel region is carried out in a state in which the image pickup signals and the reference signals subjected to vertical scanning are not held in said holding unit, said horizontal scanning unit starts horizontal scanning in a state in which the image pickup signals and the reference signals subjected to vertical scanning are held in said holding unit.

5. The image pickup sensor of claim 1, wherein said first and second reference pixel regions comprises all reference pixel regions included in the image pickup sensor.

6. An image pickup apparatus comprising:

an image pickup sensor comprising an effective pixel region in which pixels for obtaining image pickup signals used as a picked-up image are arranged, a plurality of first and second reference pixel regions in which pixels for obtaining reference signals for the image pickup signals are arranged, which are disposed adjacent to opposing sides of said effective pixel region, and wherein said first and second reference pixel regions are not adjacent to each other, a holding unit that holds the image pickup signals obtained from the effective pixel region and the reference signals obtained from the first and second reference pixel regions, the image pickup signals and the reference signals vertically scanned on a row-by-row basis, and a horizontal scanning unit that horizontally scans the image pickup signals and the reference signals held by the holding unit; and a correction unit adapted to correct for noise components of the image pickup signals based on the reference signals, wherein the horizontal scanning unit horizontally scans the reference signals obtained from the first reference pixel region held by the holding unit, then horizontally scans the reference signals obtained from said second reference pixel region held by said holding unit, then horizontally scans the image pickup signals obtained from the effective pixel region held by the holding unit.

7. An image pickup apparatus according to claim 6, wherein the horizontal scanning unit has a control unit that provides control so as to switch between a first horizontal scanning mode in which the horizontal scanning unit horizontally scans the image pickup signals obtained from the effective pixel region and the reference signals obtained from the plurality of reference pixel regions, and a second horizontal scanning mode in which the horizontal scanning unit horizontally scans the reference signals obtained from part of the plurality of reference pixel regions and the image pickup signals obtained from the effective pixel region.

8. An image pickup apparatus according to claim 7, wherein the control unit switches between the first horizontal scanning mode and the second horizontal scanning mode according to conditions on which electric noise is generated.

9. An image pickup apparatus according to claim 6, wherein the correction unit starts a process in which correction values for use in correcting for noise in pixel signals of the effective pixel region are calculated based on pixel signals of the reference pixel regions while the horizontal scanning unit is horizontally scanning the pixel signals of the effective pixel region.

10. An image pickup apparatus according to claim 6, wherein the horizontal scanning unit has a first shift register and a second shift register that output readout signals for reading out the image pickup signals and the reference signals held by the holding unit, a signal output terminal of the second shift register and a signal input terminal of the first shift register are connected to each other, and a horizontal scanning start signal is inputted to a signal input terminal of the second shift register.

11. An image pickup apparatus according to claim 6, wherein the horizontal scanning unit has a first shift register and a second shift register that output readout signals for reading out the image pickup signals and the reference signals held by the holding unit, and an input unit that selectively inputs a horizontal scanning start signal to signal input terminals of the first shift register and the second shift register.

12. An image pickup apparatus according to claim 6, wherein the horizontal scanning unit has one shift register that outputs readout signals for reading out the image pickup signals and the reference signals held by the holding unit, and after horizontal scanning on one reference pixel region of the plurality of reference pixel regions and the effective pixel region is carried out in a state in which the image pickup signals and the reference signals subjected to vertical scanning are not held in the holding unit, the horizontal scanning unit starts horizontal scanning in a state in which the image pickup signals and the reference signals subjected to vertical scanning are held in the holding unit.

13. The image pickup apparatus of claim 6, wherein said first and second reference pixel regions comprises all reference pixel regions included in the image pickup sensor.

14. A method of driving an image pickup sensor, the method comprising:

arranging, in an effective pixel region, pixels for obtaining image pickup signals used as a picked-up image;

arranging, in first and second reference pixel regions, pixels for obtaining reference signals for the image pickup signals, which are disposed adjacent to opposing sides of the effective pixel region, and wherein said first and second reference pixel regions are not adjacent to each other;

holding, by a holding unit, the image pickup signals obtained from the effective pixel region and the reference signals obtained from the first and second reference pixel regions, the image pickup signals and the reference signals vertically scanned on a row-by-row basis; and horizontally scanning, by a horizontal scanning unit, the image pickup signals and the reference signals held by the holding unit, wherein the horizontal scanning unit horizontally scans the reference signals obtained from the first reference pixel region held by the holding unit, then horizontally scans the reference signals obtained from said second reference pixel region held by said holding unit, then horizontally scans the image pickup signals obtained from the effective pixel region held by the holding unit.

15. The method of claim 14, wherein said first and second reference pixel regions comprises all reference pixel regions included in the image pickup sensor.

* * * * *